(12) United States Patent
Lupu et al.

(10) Patent No.: US 12,031,828 B2
(45) Date of Patent: Jul. 9, 2024

(54) METHOD FOR OPTIMISING A FLIGHT PLAN

(71) Applicant: Safety Line, Paris (FR)

(72) Inventors: Anamaria Lupu, Paris (FR); Arthur Llau, Paris (FR); Baptiste Gregorutti, Paris (FR)

(73) Assignee: Safety Line, Paris (FR)

( * ) Notice: Subject to any disclaimer, the term of this patent is extended or adjusted under 35 U.S.C. 154(b) by 477 days.

(21) Appl. No.: 17/594,164

(22) PCT Filed: Dec. 10, 2019

(86) PCT No.: PCT/EP2019/084413
§ 371 (c)(1),
(2) Date: Oct. 5, 2021

(87) PCT Pub. No.: WO2020/120470
PCT Pub. Date: Jun. 18, 2020

(65) Prior Publication Data
US 2022/0252401 A1 Aug. 11, 2022

(30) Foreign Application Priority Data
Dec. 13, 2018 (FR) ....................................... 1872816

(51) Int. Cl.
*G01C 21/20* (2006.01)
*G08G 5/00* (2006.01)
(52) U.S. Cl.
CPC ............ *G01C 21/20* (2013.01); *G08G 5/0013* (2013.01); *G08G 5/0021* (2013.01); *G08G 5/0039* (2013.01); *G08G 5/0091* (2013.01)
(58) Field of Classification Search
CPC .... G01C 21/20; G01G 5/0013; G01G 5/0021; G01G 5/0039; G01G 5/0091
(Continued)

(56) References Cited

U.S. PATENT DOCUMENTS 9,460,629 B2 10/2016 Chircop
9,513,125 B2 * 12/2016 Ravenscroft ......... G08G 5/0069
(Continued)

FOREIGN PATENT DOCUMENTS

WO 20200120470 A1 6/2020

OTHER PUBLICATIONS

English Translation of International Search Report & International Search Report issued in International Application No. PCT/EP2019/084413, dated Feb. 14, 2020; 7 pages.
(Continued)

*Primary Examiner* — Yazan A Soofi
(74) *Attorney, Agent, or Firm* — Morris, Manning & Martin, LLP; Daniel E. Sineway, Esq.; Adam J. Thompson, Esq.

(57) ABSTRACT

The invention relates to a method for optimising a flight plan consisting of an air route for an aircraft of a fleet of aircraft, each aircraft being designed to record flight data, the method comprising a preliminary step of learning a network of air routes specific to the fleet of aircraft, the method comprising a step of determining a fuel consumption model specific to the aircraft based on the flight data, the method comprising the subsequent steps of: —collecting meteorological data associated with the aircraft environment, and —determining an optimised flight plan for reaching the destination waypoint, based on a current position of the aircraft, the flight conditions of the aircraft, the predefined air route, the consumption model of the aircraft, the meteorological conditions and the previously defined optimal air routes.

8 Claims, 3 Drawing Sheets

(58) Field of Classification Search
USPC .......................................................... 701/122
See application file for complete search history.

(56) References Cited

U.S. PATENT DOCUMENTS

| | | | |
|---|---|---|---|
| 9,640,079 B1* | 5/2017 | Moravek | G08G 5/0021 |
| 9,858,824 B1* | 1/2018 | Zogg | G08G 5/0091 |
| 2012/0158280 A1* | 6/2012 | Ravenscroft | G08G 5/0034 |
| | | | 701/400 |
| 2014/0032106 A1* | 1/2014 | Ginsberg | G01C 21/20 |
| | | | 701/528 |
| 2016/0019795 A1* | 1/2016 | Chircop | G08G 5/0078 |
| | | | 701/3 |
| 2018/0165968 A1* | 6/2018 | Clark | G08G 5/0039 |
| 2018/0286253 A1* | 10/2018 | Darnell | G08G 5/0039 |

OTHER PUBLICATIONS

English Translation of Written Opinion & Written Opinion issued in International Application No. PCT/EP2019/084413, dated Feb. 14, 2020; 18 pages.

* cited by examiner

METHOD FOR OPTIMISING A FLIGHT PLAN

CROSS REFERENCE TO RELATED APPLICATIONS

This application is a national phase application of, and claims benefit of and priority to International Application No. PCT/EP2019/084413, filed Dec. 10, 2019, entitled "METHOD FOR OPTIMISING A FLIGHT PLAN," which claims priority to French Application No. 1872816, filed Dec. 13, 2018, entitled "METHOD OF OPTIMIZING A FLIGHT PLAN," the disclosures of which are incorporated herein by reference as if set forth herein in their entireties.

TECHNICAL FIELD

The present invention relates to the field of aeronautics, and more particularly to a method for optimising a flight plan.

STATE OF THE ART

Before each flight of an aircraft, i.e. before the aircraft takes off from its origin airport to reach a destination airport, the pilots of the aircraft must prepare for this flight in order to adapt the aircraft and the flight parameters to the day's conditions (meteorological conditions, aircraft loading, etc.).

One important point of this preparation is determining the quantity of fuel that the aircraft must carry to make the flight. The quantity of fuel to be carried corresponds to the forecast of the quantity of fuel that will be consumed during the flight plus various fuel reserves intended to ensure flight safety in case of unforeseen events (waiting at the arrival airport, diversion, bad weather conditions, etc.). In order to determine the quantity of fuel to be carried for a flight, pilots generally use software provided by the manufacturer of the aircraft.

Among other things, this software uses an air route allowing the aircraft to reach its destination airport from its origin airport as an input parameter to determine the quantity of fuel to be carried. This air route is included in a flight plan (or operational flight plan). This air route is defined (or planned) according to various parameters, including the origin, destination and meteorological conditions available during its development. The software also uses parameters depending on the type of aircraft and its configuration, as well as parameters depending on the meteorological conditions available. Thus, from the type of aircraft, the software uses a fuel consumption model generally supplied by the manufacturer of the aircraft ("SCAP module" for "standard computerised airplane performance module"). Said model gives the consumption of the aircraft for each phase of a flight (taxiing on departure, take-off, climb, cruise, descent, approach, landing and taxiing on arrival).

However, the pilots of an aircraft can decide during the flight to modify the flight plan followed. This choice is frequently dictated by the evolution of the meteorological conditions between when the flight plan is issued, said flight plan comprising a forecast air route, and the flight itself. Indeed, in some cases, as much as several hours may elapse between the development of the flight plan and the take-off of the aircraft. Therefore, depending on the actual flight conditions, particularly depending on the meteorological conditions encountered, the pilots can choose to:

- deviate from the forecast air route, for example in order to avoid a meteorological phenomenon;
- increase the speed of the aircraft to try to make up for any delay;
- reduce the speed of the aircraft to avoid waiting time on arrival in the event of congestion at the destination airport.

Today, pilots can only rely on their experience to make these decisions. They do not have tools to offer an optimised air route based on the forecast air route. The present invention proposes a system for optimising a flight plan according to a given criterion: reducing consumption by offering direct routes or reducing the time spent in flight by adapting the speed of the aircraft. Possibly, a flight plan can be optimised according to another criterion (for example to avoid meteorological phenomena, to avoid certain geographical areas, etc.). It is possible to optimise a flight plan by taking into account several optimisation criteria; the various criteria are then prioritised or weighted. In particular, pilots do not have tools to generate alternative route recommendations making it possible to adapt to flight conditions, particularly to meteorological conditions. The objective of optimising the flight plan may be to reduce the flight time at the same consumption, or else to reduce the consumption more generally during the flight of the aircraft.

More generally, due to unpredictable parameters during a flight, particularly meteorological conditions, the time of arrival of an aircraft at its destination may vary. A thunderstorm can thus force a pilot to divert his aircraft, which causes a delay and possibly over-consumption. Conversely, a particularly favourable wind can save time on the flight plan that was initially planned. While it is not desirable to arrive at the destination late, for obvious reasons, it is also undesirable to arrive at the destination early, since this can generate a waiting time as long as a slot is not available for landing.

It is therefore necessary to propose a solution allowing the optimisation, possibly in real time and in an on-board system that can be used directly by the pilots of an aircraft, of a forecast air route by taking into account a first constraint of reducing consumption, but also possibly a second constraint of flight time, or, in other words, a second constraint of a time of arrival at destination.

DISCLOSURE OF THE INVENTION

The invention relates to a method for optimising a predefined flight plan consisting of an air route for an aircraft of a fleet of aircraft, an air route consisting of an ordered series of waypoints between an origin waypoint and a destination waypoint, each aircraft being designed to record data, called flight data, associated with the use of said aircraft, the method comprising a preliminary step of learning a network of air routes specific to the fleet of aircraft, this preliminary step comprising the steps of:

- collecting, for each aircraft in the fleet, the flight data recorded by said aircraft,
- recording said flight data in a database, each flight datum being recorded in association with a segment of an air route, a segment being a portion of the air route delimited by two consecutive waypoints,
- determining, for each air route segment from the database, a probability of acceptance of said segment and performance indicators based on the flight data collected,
- determining an optimal air route for performing each path of a plurality of predetermined paths by means of a machine learning method, each predetermined path being defined by an origin waypoint and a destination waypoint, the method comprising a step of:
determining a fuel consumption model specific to the aircraft based on the flight data, the method comprising the subsequent steps of:
collecting meteorological data associated with the aircraft environment, and
determining an optimised flight plan for reaching the destination waypoint, based on a current position of the aircraft, the flight conditions of the aircraft, the predefined air route, the consumption model of the aircraft, the meteorological conditions and the previously defined optimal air routes.

According to an additional embodiment of the invention, the preliminary step of learning a network of air routes specific to the fleet of aircraft comprises the additional steps of:
collecting data, called external data, said external data corresponding to a database of waypoints or potentially usable routes, then
determining a graph, a vertex of the graph corresponding to a waypoint recorded in the database, an edge of the graph being a function of the acceptance probability and of the performance indicators of the segment represented by the edge.

According to an additional embodiment of the invention, the step of collecting meteorological data associated with the aircraft environment and subsequent steps are executed by an electronic device on board the aircraft and in real time.

The invention also relates to an electronic device designed to implement all or some of the steps of the method that is the subject of the invention.

The invention also relates to a system allowing optimisation of a predefined flight plan of an aircraft of a fleet of aircraft according to the method that is the subject of the invention, the system comprising:
one or more electronic devices designed to carry out all or some of the steps of the method that is the subject of the invention.

The invention also relates to a computer program, which can be stored on a medium and/or downloaded from a communication network, in order to be read by a processor of an electronic device. This computer program comprises instructions for implementing all or some of the steps of the method for optimising a flight plan for an aircraft that is the subject of the invention when said program is executed by the processor.

The invention also relates to an information storage medium or recording medium comprising such a computer program.

BRIEF DESCRIPTION OF THE DRAWINGS

The features of the invention mentioned above, as well as others, will emerge more clearly on reading the following description of one embodiment, said description being given in relation to the accompanying drawings, in which.

DETAILED DESCRIPTION OF EMBODIMENTS

The optimisation method described in this document can be implemented for a fleet of aircraft, each aircraft being designed to record data known as flight data during its use. Said flight data can be recorded in systems such as QAR recorders (for "Quick Access Recorder") or else in DFDR recorders (for "Digital Flight Data Recorder"), more colloquially called "black boxes". The flight data typically comprise data that may be time-stamped, such as for example the position of the aircraft (latitude, longitude, altitude), its relative flight speed (given by a pitot probe, for example) or its absolute flight speed (with respect to the ground, given by a GPS sensor, for example), its instantaneous and/or average consumption, its heading, the meteorological conditions encountered (or real conditions), etc.

Figure 1:
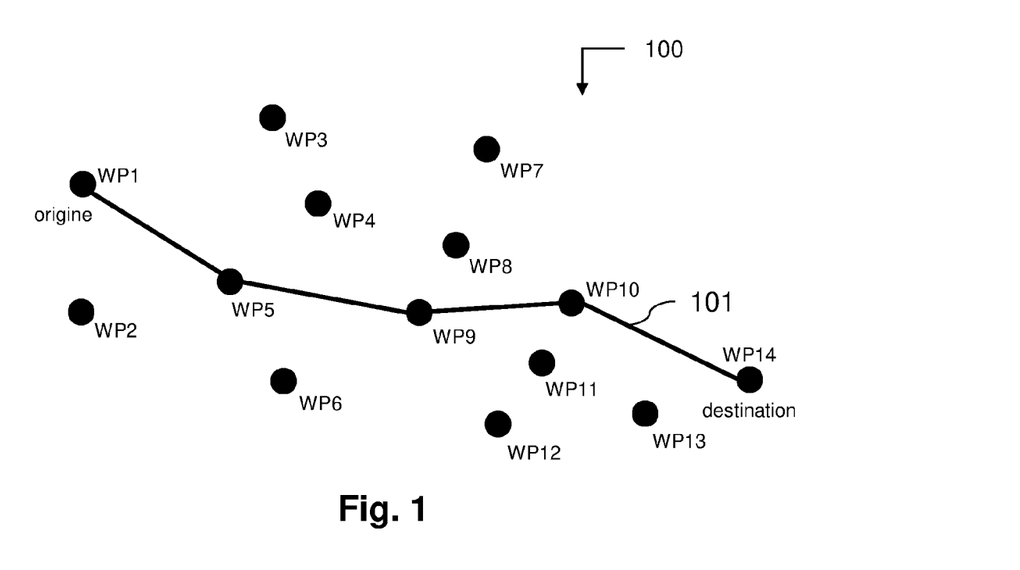
FIG. 1 schematically illustrates a predefined air route between a waypoint referred to as the origin waypoint and a waypoint referred to as the destination waypoint, the predefined air route comprising an ordered selection of waypoints from among a plurality of waypoints, FIG. 2 schematically illustrates an optimised air route from the predefined air route illustrated in FIG. 1 according to one embodiment of the invention, FIG. 3 schematically illustrates a functional architecture of a system allowing optimisation of a predefined flight plan according to one embodiment of the invention, FIG. 4 schematically illustrates a method allowing optimisation of a predefined flight plan according to one embodiment of the invention, FIG. 5 schematically illustrates a hardware architecture of a system allowing optimisation of a flight plan according to one embodiment of the invention.

FIG. 1 schematically illustrates a predefined air route 101 between a waypoint referred to as the origin waypoint WP1 and a waypoint referred to as the destination waypoint WP14, the predefined air route 101 comprising an ordered selection (or ordered list) of waypoints (WP1, WP5, WP9, WP10, WP14) from among a plurality of existing waypoints (WP1, . . . , WP14).

In this example, the waypoint WP1 is typically a departure airport of an aircraft. Likewise, the waypoint WP14 typically corresponds to a destination or arrival airport of the aircraft.

Each waypoint WP1, . . . , WP14 is for example defined by its GPS (for "Global Positioning System") coordinates, or by any other coordinate in any other reference system. The coordinates typically include two or three parameters, for example a latitude and a longitude, or a latitude, a longitude and an altitude. If a waypoint is defined by a latitude and a longitude, then a segment between two waypoints can also be additionally defined by a flight altitude during travel along the segment.

The predefined air route 101 is typically determined by the airline company managing the aircraft during a preparation phase of a flight of the aircraft between a departure airport corresponding to the waypoint WP1 and a destination airport corresponding to the waypoint WP14. The predefined air route 101 is typically determined using software as previously described.

The problem that the present invention proposes to solve is that of optimising a flight plan, and in particular the air route 101, based in particular on the flight conditions of the aircraft, such as for example the meteorological conditions actually encountered. According to one embodiment, the invention also makes it possible to optimise an air route in order to maintain an arrival time, that is to say to compensate for a delay or an advance on the travel time initially planned.

Figure 2:
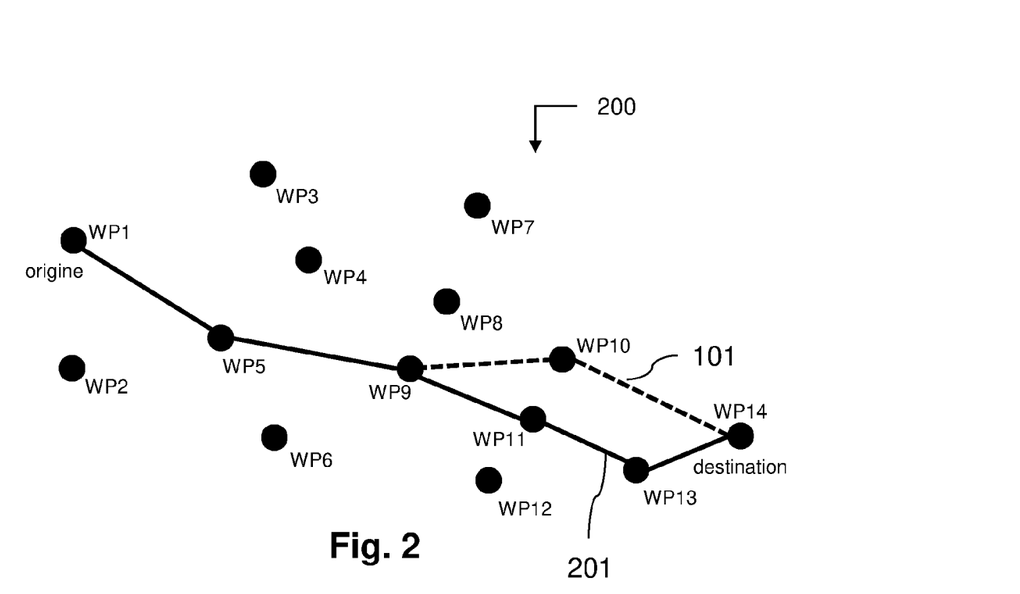

Thus, FIG. 2 schematically illustrates an optimised route 201 from the predefined route 101 illustrated in FIG. 1 according to one embodiment of the invention.

In this example, the predefined air route 101 is modified—or optimised—with the waypoint WP10 removed from the air route and replaced by the waypoints WP11 and WP13. The air route 201 thus determined may be better suited, for example, to the meteorological conditions encountered by the aircraft during its flight. The air route 201 may also be shorter than the air route 101, as the initial planning for the air route 101 disregarded passage through the waypoints WP11 and WP13 for various reasons (e.g. overflight subject to clearance or sometimes denied when passing the waypoint WP11). The method for optimising the flight plan can be executed at any time during the flight of the aircraft. The method is advantageously executed in real time in order to allow better adaptation to the external conditions encountered by the aircraft, for example meteorological conditions.

Figure 3:
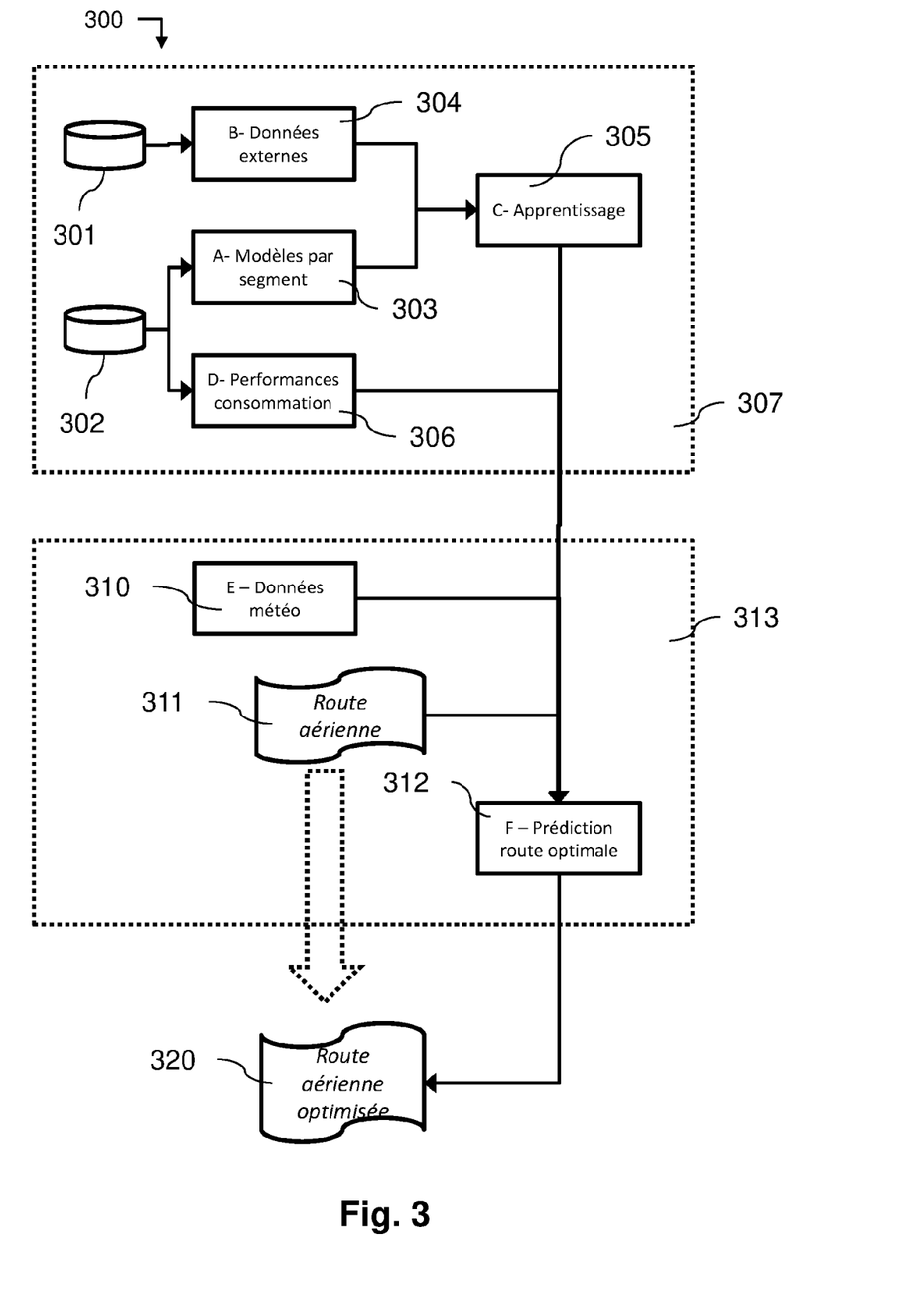

FIG. 3 schematically illustrates a functional architecture of a system 300 allowing optimisation of a predefined flight plan, for example the predefined air route 101, according to one embodiment of the invention.

The functional module A 303 makes it possible to collect, for each aircraft in the fleet, the flight data recorded by said aircraft. Thus, the functional module A 303 can query and/or receive the flight data from one or more aircraft of a fleet of aircraft. Alternatively, the functional module A 303 can collect said data from a so-called intermediate database, which in turn collects these flight data directly from the aircraft of the fleet. The database 302 illustrated in FIG. 3 can therefore correspond to one of the plurality of databases on board each aircraft of the fleet, for example a database linked to a QAR recorder or else to a DFDR recorder. The database 302 can also represent an intermediate database for collecting flight data from the various aircraft of the fleet.

These flight data for each aircraft in the fleet are recorded in a database. Each flight datum is recorded in association with a segment of an air route. A segment of an air route is a portion of the air route delimited by two consecutive waypoints. In other words, the collected flight data are recorded in a database so as to characterise each segment of the air routes followed by the aircraft of the fleet. Thus, for each air route segment, data (or performance indicators) can be recorded in a database, in association with the route segment travelled; these data may be the distance travelled between the two waypoints (i.e. the length of the segment), the duration of segment travel by each aircraft, the travel speed on the segment, consumption, altitude, meteorological conditions encountered, drift experienced, etc. A probability that the air route segment will be accepted by air traffic control is also recorded in association with the flight data. This probability can be deduced from the collected flight data by making a ratio between the different air routes followed for a path between two given waypoints. Thus, the functional module A 303 makes it possible to construct a database of the various air routes used by the aircraft of the fleet by collecting the flight data of the aircraft of the fleet. In this database, each air route is split into a plurality of segments, each segment being associated with performance indicators such as the distance between the origin waypoint of the segment and the destination waypoint of the segment, an average or median duration of segment travel, an average or median consumption, and a probability of authorisation by air traffic control for the use of the segment.

The functional module B 304 makes it possible to collect data, called external data, said external data corresponding to a database of waypoints or potentially usable routes by an aircraft, for example an external database 301. In other words, the functional module B 304 makes it possible to enrich a database created by the functional module A 303 by adding external data thereto. These external data can correspond to data originating for example from a so-called "official" database 301 of waypoints. These data can come from a database 301 of air routes, such as for example that of a flight tracking site such as "flightradar24.com". These data can thus include routes used by aircraft of airlines other than the airline managing the aircraft fleet.

The functional module A 303, alone or else in combination with the functional module B 304, thus makes it possible to build a database from flight data and to determine a graph representing the various possible air routes. A vertex of this graph corresponds to a waypoint recorded in the database and an edge of this graph corresponds to a segment between two waypoints. Each segment is associated with the acceptance probability and performance indicators for the segment represented by the edge. Thus, the functional modules A 303 and B 304 make it possible to construct a graph, possibly weighted, for which several choices of air routes are possible for a journey from an origin waypoint to a destination waypoint.

As input, the functional module C 305 takes the result of the functional module A 303 or, preferably, the result of the functional module A 303 and of the functional module B 304. The functional module C 305 makes it possible to learn a network of air routes from the flight data recorded in the database by the functional modules A 303 and B 304. In particular, a probability that a given air route will be authorised by air traffic control is associated with each air route at the end of the learning method. In other words, the functional module C 305 makes it possible to carry out a calculation by machine learning of the probability that an air route will be authorised. As input, the functional module C 305 uses the graph, possibly weighted, constructed by the modules A 303 and/or B 304 and allows the application of methods for training a model on the previously constructed flight data graph, for example a machine learning method or else a data mining method.

The functional module D 306 makes it possible to determine performance indicators specific to a particular aircraft in the fleet, namely the one for which the flight plan optimisation method according to this document is implemented. The functional module D 306 makes it possible to determine the performance of the aircraft in terms of fuel consumption specific to the aircraft, namely performance taking into account the past and the wear and tear of the aircraft. In other words, the functional module D 306 makes it possible to determine a fuel consumption model specific to the aircraft, based on the flight data (obtained from the database 302, but using only the flight data relating to the aircraft in question).

The functional module D 306 can directly collect the flight data of the aircraft in question by querying, for example, the QAR or DFDR flight data recorders of the aircraft, or else extract the flight data relating only to the aircraft in question from a database constructed by the functional module A 303, the functional module B 304 or else the functional module C 305.

From the collected flight data, the functional module D 306 can build a model of the performance (or the fuel consumption) of the aircraft in question by using machine learning methods. The performance model may only take into account parameters used to describe a predefined air route described in a flight plan. For example, the aircraft performance model can be defined from parameters such as:

weight of the aircraft on take-off and/or in flight (or "TOW" for "Take-Off Weight" and/or "GW" for "Gross Weight"), a flight altitude of the aircraft (or "FL" for "Flight Level"), a flight speed of the aircraft (or "Mach"),
wind speed and direction,
an outside temperature (or "SAT" for "Static Air Temperature").

For each air route followed by the aircraft for which a performance model is to be developed, the implemented machine learning method can define a division of said air route into a section of constant altitude. In fact, it is considered that the aircraft, at constant altitude, is in a stationary state, the instantaneous consumption then remaining equal at constant speed.

The functional module D 306 makes it possible to obtain, for each distinct aircraft of the aircraft fleet, a performance (or fuel consumption) model that depends simultaneously on the flight data (flight altitude, mass of the aircraft, flight speed, etc.), meteorological data encountered during flights (outside temperature, wind speed, etc.) and data of the air routes followed (segment of the air route taken, type of aircraft, identifier or registration, etc.). A performance model, which is potentially different because it is individualised, is therefore associated with each aircraft in the fleet.

The various functional modules A 303, B 304, C 305 and D 306 use data from databases (such as databases 301 or 302, and/or aircraft flight recorders) as inputs. These data can be collected "offline", that is to say before the implementation of the flight plan optimisation method. In other words, the functional modules A 303, B 304, C 305 and D 306 can be implemented on demand or periodically in "offline mode", unlike the functional modules E 310 and F 312 described below, which can advantageously be implemented in real time. The functional modules defined in zone 307 are thus advantageously, but not necessarily, used in offline mode. The functional modules defined in zone 313 are thus advantageously, but not necessarily, used in real-time mode. It is, however, advantageous for the meteorological data collected (by the functional module E 310) and used by the optimisation method (particularly by the functional optimisation module F 312 itself) to be as close as possible to the actual meteorological conditions encountered by the aircraft.

The functional module E 310 makes it possible to collect meteorological data, ideally in real time, or at least the most correlated with the meteorological conditions encountered by the aircraft during its flight, that is to say during the execution of the flight plan optimisation method. In other words, the functional module E 310 makes it possible to collect meteorological data associated with the aircraft environment. The functional module E 310 can ideally collect the meteorological data from the on-board equipment of the aircraft. The functional module E 310 can also collect meteorological data received from a ground system, particularly forecasts of changes in meteorological conditions adapted to the predefined air route followed. The flight plan optimisation method therefore takes into account the meteorological conditions currently encountered by the aircraft. The meteorological data thus collected by the functional module E 310 are used as input for the functional module F 312 for the actual optimisation of a predefined air route 311.

The air route 311 is typically the predefined air route when preparing a flight plan for an aircraft. The air route 311 can also be a route previously optimised by means of the present method, it being possible to carry out a new optimisation to respond to the evolution of the meteorological conditions or else to respond to an air route choice made by the pilots of the airplane; said pilots remain the sole decision-makers with respect to the air route actually followed.

The functional module F 312 uses, as inputs, the graph showing the network of air routes and segments produced by the functional module C 305, the performance model specific to the aircraft produced by the functional module D 306, the meteorological data collected by the functional module E 310 and, of course, an air route 311 to be optimised. Said air route to be optimised is a route defined between the current position of the aircraft, possibly the origin waypoint, and its destination waypoint. The functional module F 312 thus makes it possible to determine an optimised air route for reaching the destination waypoint, based on a current position of the aircraft, the flight conditions of the aircraft, the predefined air route, the consumption model of the aircraft (or performance model of the aircraft), the meteorological conditions and the previously defined optimal air routes.

According to one embodiment of the invention, the functional module F 312 makes it possible to determine, based on the aforementioned parameters but also on a possible delay or a possible advance on the predefined air route, an optimised route making it possible to remedy said delay or advance, possibly only partially. Thus, a planned arrival time can be respected, or at least the possible delay or the possible advance can be minimised.

The functional module F 312 can implement a machine learning method to determine an optimal air route from a current air route. The current air route may correspond to the predefined air route, or more precisely to the air route between the current position of the aircraft on the predefined air route and the destination waypoint. The functional module F 312 allows the generation, possibly in real time, of segment recommendations, that is to say of the next waypoints to be followed, ultimately allowing the total consumption of the aircraft to be reduced in order to reach the aircraft destination on schedule.

The functional module F 312 therefore determines an optimised air route 320 from the air route 311.

The various functional modules described in FIG. 3 can be implemented in the same electronic device or else in different electronic devices that can communicate with one another. Possibly, an electronic device comprising the so-called "real-time" functional modules E 310 and F 312 is an electronic device that can be on board the aircraft. This same electronic device can possibly also include the module D 306.

Figure 4:
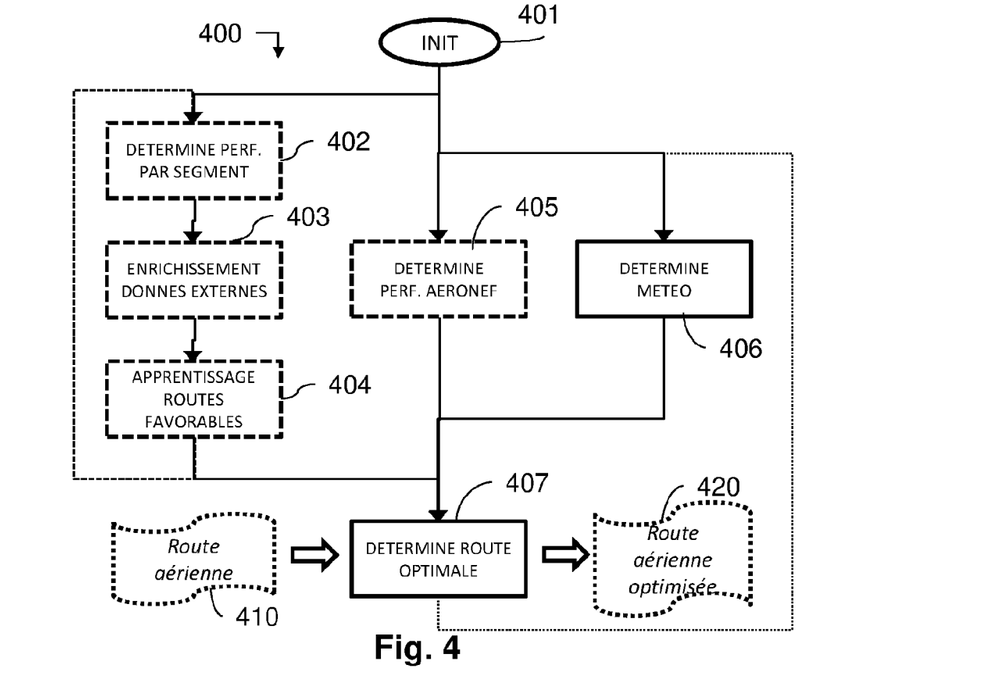

FIG. 4 schematically illustrates a method 400 allowing optimisation of a predefined route 410 according to one embodiment of the invention. The method 400 is possibly implemented by an electronic device on board an aircraft, the method 400 then allowing optimisation of the air route followed by said aircraft.

A first step 401 corresponds to initialising the optimisation method. The method can be initialised, possibly partially, for example during the integration of a new aircraft into a fleet of aircraft.

Following the initialisation, a step 402 is implemented. This step 402 is advantageously executed by the functional module A 303 described in FIG. 3. During this step 402, the electronic device collects, for each aircraft in the fleet, the flight data recorded by said aircraft, and records said flight data in a database, each flight datum being recorded in association with a segment of an air route, a segment being a portion of the air route delimited by two consecutive waypoints. During this step 402, the electronic device executes the functions of the functional module A 303.

Said flight data, recorded in association with each segment, may for example comprise a speed of the aircraft, a travel time of the segment or a consumption.

In a following optional step 403, the electronic device collects data, called external data, said external data corresponding to a database of waypoints or potentially usable routes. These external data are recorded and enrich the database created during the previous step. This step 403 is advantageously executed by the functional module B 304. During this step 403, the electronic device executes the functions of the functional module B 304.

In a following step 404, the electronic device determines, for each air route segment from the database, a probability of acceptance of said segment and performance indicators based on the flight data collected. From the collected flight data and external data, the electronic device determines a graph, a vertex of the graph corresponding to a waypoint recorded in the database, an edge of the graph being a function of the acceptance probability and of the performance indicators of the segment represented by the edge. Then, the electronic device determines an optimal air route for performing each path of a plurality of predetermined paths by means of a reinforcement learning method, each predetermined path being defined by an origin waypoint and a destination waypoint. This step 404 is advantageously executed by the functional module C 305. In other words, during step 404, the electronic device executes the functions of the functional module C 305.

In a step 405, which may possibly be executed in parallel with steps 402, 403 and 404, the electronic device determines a fuel consumption model specific to the aircraft based on the flight data. This step 405 is advantageously executed by the functional module D 306. In other words, during step 405, the electronic device executes the functions of the functional module D 306.

Steps 402, 403, 404 and 405 allow a database to be created, by means of the electronic device, from flight data and allow a graph representing the various possible air routes to be determined, as well as a performance model for the aircraft in question by optimisation of its followed flight plan. These steps can be performed on demand, periodically, or continuously in the background. These steps can be performed in "offline" mode by an electronic device. This electronic device can be designed to communicate with another on-board electronic device, this other on-board electronic device performing steps 406 and 407 of the method. All the steps can be carried out by the same electronic device, the electronic device for example being designed to collect meteorological data collected by an aircraft and to send a flight plan optimisation result to the aircraft. In other words, the steps of the method 400 can be carried out by one or more coordinated electronic devices, one or more of them possibly being on board the aircraft. It should be noted that creating the database of flight data and a performance model of an aircraft then makes it possible to model a variation of a parameter, for example the speed of the aircraft when travelling along a segment.

Step 406 of the method 400 can advantageously be carried out continuously in parallel with steps 402, 403, 404 and 405. The electronic device advantageously executes step 406 in real time, the electronic device collecting meteorological data associated with the aircraft environment. This step 406 is advantageously executed by the functional module E 310. In other words, during step 406, the electronic device executes the functions of the functional module E 310.

Once steps 404, 405 and 406 have been performed, potentially continuously, the electronic device can perform step 407 for optimising an air route 410. This optimisation step 407 is advantageously executed on demand by the functional module F 312. In other words, during step 407, the electronic device executes the functions of the functional module F 312.

At the output of step 407, the electronic device determines an optimised air route 420 for reaching the destination waypoint of the aircraft, based on a current position of the aircraft, the flight conditions of the aircraft, the predefined air route, the consumption model of the aircraft, the meteorological conditions and the previously defined optimal air routes. This optimisation can account for a possible delay or a possible advance with respect to a predefined air route in order to best meet a planned arrival time, while at the same time optimising consumption.

Figure 5:
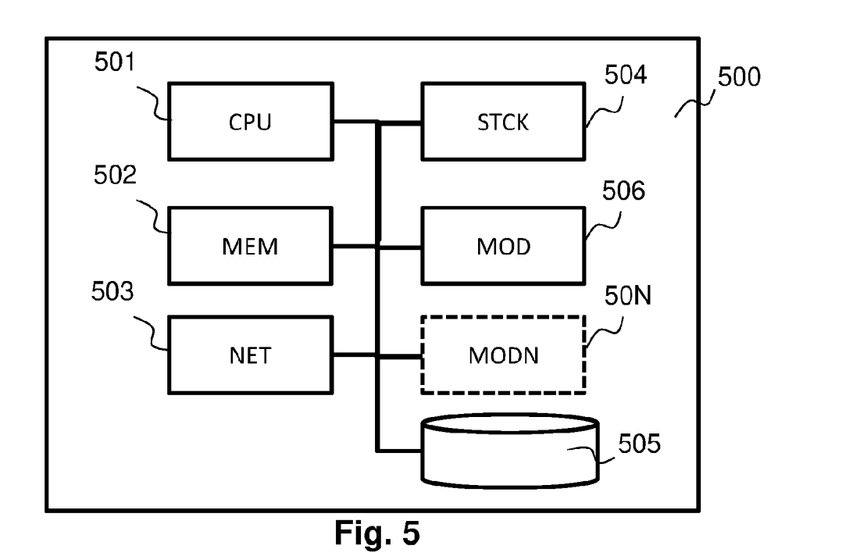

FIG. 5 schematically illustrates a hardware architecture of a system or of an electronic device 500 allowing optimisation of a predefined flight plan according to one embodiment of the invention.

The electronic device 500 corresponds for example to one of the electronic devices described above comprising all or some of the functional modules A 303, B 304, C 305, D 306, E 310 and F 312.

The system or electronic device 500 is designed to carry out the method described in FIG. 4.

The electronic device 500 comprises, connected by a communication bus: a processor or CPU (Central Processing Unit) 501; a memory MEM 502 of the RAM (Random Access Memory) and/or ROM (Read-Only Memory) type, a network module NET 503, a storage module STCK 504 of the internal storage type, and possibly a database 505 and other modules 506 to 50N of different types. A module 506 to 50N can correspond to one of the functional modules A 303, B 304, C 305, D 306, E 310 and F 312. The storage module STCK 504 can be of the HDD (Hard Disk Drive) or SSD (Solid-State Drive) type, or of the external storage media drive type, such as an SD (Secure Digital) card reader. The processor CPU 501 can store data, or information, in the memory MEM 502 or in the storage module STCK 504. The processor CPU 501 can read data stored in the memory MEM 502, in the storage module STCK 504 or even in the database 505. These data can correspond to configuration parameters, collected flight data, collected meteorological data or to data of any kind received for example in a message received via the network module NET 503, or via another communication module 50N. The network module NET 503 allows the electronic device 500 to be connected to a communication network. The network module NET 503 allows the electronic device 500 to send, and respectively receive, messages to, and respectively from, one or more connected information sources, connected databases or any other electronic device comprising one or any other of the functional modules A 303, B 304, C 305, D 306, E 310 and F 312.

The processor CPU 501 is capable of executing instructions loaded into the memory MEM 502, for example from the storage module STCK 504 or from a communication network through the network module NET 503, or from another communication module 50N, for example. When the electronic device 500 is powered on, the processor CPU 501 is able to read instructions from the memory MEM 502 and execute them. These instructions form a computer program causing the implementation, by the processor CPU 501, of all or some of the methods and steps described above, particularly in the description of FIG. 4. Thus, all or some of the methods and steps described above can be implemented in software form by executing a set of instructions by a programmable machine, such as a DSP (Digital Signal Processor) or a microcontroller. All or some of the methods and steps described here can also be implemented in hardware form by a machine or a dedicated component, such as an FPGA (Field-Programmable Gate Array) or an ASIC (Application-Specific Integrated Circuit). The functions of the electronic device 500 can be integrated into a computer server known to a person skilled in the art. This server can be a server intended to be embedded in an avionics system of an aircraft.

The invention claimed is:

1. A method for optimizing a predefined flight plan comprising of an air route for an aircraft of a fleet of aircraft, an air route consisting of an ordered series of waypoints between an origin waypoint and a destination waypoint, each aircraft being designed to record data, called flight data, associated with the use of said aircraft, the method comprising a preliminary step of learning a network of air routes specific to the fleet of aircraft, this preliminary step comprising the steps of:
collecting, for each aircraft in the fleet, the flight data recorded by said aircraft,
recording said flight data in a database, each flight datum being recorded in association with a segment of an air route, a segment being a portion of the air route delimited by two consecutive waypoints,
determining, for each air route segment of the database, a probability of authorisation by an air traffic control for the use of said segment, based on the collected flight data,
determining, for each air route segment from the database, performance indicators comprising: the distance between the two consecutive waypoints of the segment, an average or median duration of the segment travel, and an average or median fuel consumption, based on the collected flight data, and
determining an optimal air route for performing each path of a plurality of predetermined paths via a machine learning method, each predetermined path being defined by an origin waypoint and a destination waypoint,
the method comprising a step of:
determining a fuel consumption model specific to the aircraft based on the flight data,
the method comprising the subsequent steps of:
collecting meteorological data associated with the aircraft environment, and
determining an optimised flight plan for reaching the destination waypoint, based on a current position of the aircraft, the flight conditions of the aircraft, the predefined air route, the consumption model of the aircraft, the meteorological conditions and the previously defined optimal air routes.

2. The method of claim 1, the preliminary step of learning a network of air routes specific to the aircraft fleet comprising the additional steps of:
collecting data, called external data, said external data corresponding to a database of waypoints or potentially usable routes, then,
determine a graph, a vertex of the graph corresponding to a waypoint recorded in the database, an edge of the graph being a function of the probability of authorisation by air traffic control of the use of said segment and of the performance indicators of the segment represented by the edge.

3. The method of claim 1, wherein the steps of collecting meteorological data associated with the aircraft environment and subsequent steps being executed by an electronic device on board the aircraft and in real time.

4. An electronic device designed to implement the steps of the method according to claim 1.

5. An electronic device designed to be on board an aircraft, the electronic device being designed to implement the following steps of the method according to claim 1:
collecting meteorological data associated with the aircraft environment,
determining an optimised flight plan for reaching the destination waypoint, based on the current position of the aircraft, the flight conditions of the aircraft, the predefined air route, the consumption model of the aircraft, the meteorological conditions and the previously defined optimal air routes.

6. A system for optimisation of a predefined flight plan for an aircraft of a fleet of aircraft according to the method of claim 1, the system comprising:
a first electronic device configure to:
collect meteorological data associated with the aircraft environment,
determine an optimised flight plan for reaching the destination waypoint, based on the current position of the aircraft, the flight conditions of the aircraft, the predefined air route, the consumption model of the aircraft, the meteorological conditions and the previously defined optimal air routes, and
a second electronic device designed to execute the steps of the method according to claim 1 not executed by the first electronic device.

7. A computer program, characterized in that it comprises instructions for implementing, by a processor of an electronic device, the steps of the method for optimizing a predefined flight plan for an aircraft of a fleet of aircraft, according to claim 1, when the computer program is executed by the processor.

8. A recording medium, readable by an electronic device, on which the computer program according to claim 1 is stored.

* * * * *